United States Patent
Burritt et al.

(10) Patent No.: US 9,054,910 B1
(45) Date of Patent: Jun. 9, 2015

(54) APPARATUS AND METHOD FOR PROVIDING STATUS INFORMATION TELECOMMUNICATION

(75) Inventors: David Ray Burritt, Broomfield, CO (US); Paul Roller Michaelis, Louisville, CO (US); Lee Joseph Wilson, Freehold, NJ (US)

(73) Assignee: Avaya Inc., Basking Ridge, NJ (US)

( * ) Notice: Subject to any disclaimer, the term of this patent is extended or adjusted under 35 U.S.C. 154(b) by 2632 days.

(21) Appl. No.: 11/649,901

(22) Filed: Jan. 3, 2007

Related U.S. Application Data

(63) Continuation-in-part of application No. 10/251,249, filed on Sep. 20, 2002.

(51) Int. Cl.
*H04L 29/02* (2006.01)
*H04L 29/06* (2006.01)

(52) U.S. Cl.
CPC .... *H04L 29/06027* (2013.01); *H04L 29/06326* (2013.01)

(58) Field of Classification Search
CPC .............. H04L 29/06027; H04L 29/06326; H04M 7/006
USPC .......... 370/352–354, 401; 713/168–170, 185, 713/191; 455/412.1, 466; 379/52, 71, 72, 379/88.17, 90.01, 93.15, 93.17, 100.09, 379/114.01, 142.15, 112.17, 355.02; 726/11; 704/271, 272
See application file for complete search history.

(56) References Cited

U.S. PATENT DOCUMENTS

| | | |
|---|---|---|
| 5,220,674 A | 6/1993 | Morgan et al. |
| 5,548,729 A | 8/1996 | Akiyoshi |
| 5,809,415 A | 9/1998 | Rossmann |
| 6,192,341 B1 | 2/2001 | Becker et al. |
| 6,404,859 B1* | 6/2002 | Hasan ........................ 379/88.04 |
| 6,628,644 B1 | 9/2003 | Nelson et al. |
| 6,661,779 B2 | 12/2003 | Johnson et al. |
| 6,665,375 B1 | 12/2003 | Forlenza et al. |
| 6,678,659 B1 | 1/2004 | Van Kommer |
| 6,816,578 B1* | 11/2004 | Kredo et al. ............... 379/88.17 |
| 6,975,712 B1 | 12/2005 | Schnarel et al. |
| 7,034,853 B2 | 4/2006 | Cho et al. |
| 7,061,902 B1 | 6/2006 | Fukuyama et al. |
| 7,113,503 B1 | 9/2006 | Basore |
| 7,197,120 B2 | 3/2007 | Luehrig et al. |
| 7,286,649 B1* | 10/2007 | Nelson et al. ................. 379/71 |
| 7,406,710 B1* | 7/2008 | Zellner et al. ................. 726/14 |
| 2001/0021186 A1* | 9/2001 | Ono et al. .................... 370/352 |

(Continued)

Primary Examiner — Ellen Tran
(74) Attorney, Agent, or Firm — John C Moran

(57) ABSTRACT

A method and apparatus provide terminal status information by a telecommunication terminal as audio information by generating terminal status information by a telecommunication terminal; establishing a direct connection by a monitor computer to the telecommunication terminal via a direct link to the telecommunication terminal; transmitting the generated terminal status information to the monitor computer by the telecommunication terminal via the direct link; converting the generated terminal status information to audio terminal status information by the monitor computer; and presenting the audio terminal status information to a user of the telecommunication terminal. In addition, the method and apparatus establish a firewall by the telecommunication terminal to prevent the monitor computer from communicating on a network to which the telecommunication terminal is connected whereby the monitor computer is also denied access to other devices connected to the network.

37 Claims, 12 Drawing Sheets

(56) References Cited

U.S. PATENT DOCUMENTS

| | | |
|---|---|---|
| 2002/0090980 A1 | 7/2002 | Wilcox et al. |
| 2002/0159573 A1* | 10/2002 | Hitzeman et al. .......... 379/88.17 |
| 2002/0159574 A1 | 10/2002 | Stogel |
| 2003/0056003 A1 | 3/2003 | Nakatani |
| 2003/0095650 A1 | 5/2003 | Mize |
| 2003/0118007 A1 | 6/2003 | Williams |
| 2003/0214519 A1 | 11/2003 | Smith et al. |
| 2004/0057417 A1 | 3/2004 | Burritt |
| 2004/0114730 A1 | 6/2004 | Koch |
| 2005/0157861 A1 | 7/2005 | Bossemeyer |
| 2005/0163316 A1 | 7/2005 | Wing |
| 2005/0198096 A1* | 9/2005 | Shaffer et al. ................. 709/200 |
| 2005/0201542 A1 | 9/2005 | Wengrovitz |

* cited by examiner

US 9,054,910 B1

APPARATUS AND METHOD FOR PROVIDING STATUS INFORMATION TELECOMMUNICATION

CROSS REFERENCE TO RELATED APPLICATIONS

This patent application is a Continuation In Part of U.S. patent application Ser. No. 10/251,249, filed on Sep. 20, 2002. U.S. patent application Ser. No. 10/251,249 is hereby incorporated by reference.

TECHNICAL FIELD

This invention relates to telecommunication switching systems, and in particular, to the provision of status information.

BACKGROUND OF THE INVENTION

Within the prior art, it is well known to convert visual terminal status information to audio information so that visually impaired people can receive the status information. Terminal status information includes, but is not limited to, caller identification (name and number), call operations, telephony terminal states, and notification that a new voicemail message has arrived. The prior art has provided the audio information for terminal status information by utilizing special hardware to perform voice synthesis. This hardware was designed specifically for visually impaired users, and consequently, was expensive. In addition, the special hardware was connected between the telephone set of the user and the telecommunication system.

SUMMARY OF THE INVENTION

A method and apparatus provide terminal status information by a telecommunication terminal as audio information by generating terminal status information by a telecommunication terminal; establishing a direct connection by a monitor computer to the telecommunication terminal via a direct link to the telecommunication terminal; transmitting the generated terminal status information to the monitor computer by the telecommunication terminal via the direct link; converting the generated terminal status information to audio terminal status information by the monitor computer; and presenting the audio terminal status information to a user of the telecommunication terminal. In addition, the method and apparatus establish a firewall by the telecommunication terminal to prevent the monitor computer from communicating on a network to which the telecommunication terminal is connected whereby the monitor computer is also denied access to other devices connected to the network.

Further, the method and apparatus provide terminal status information intended for visual presentation as audio information by establishing a direct connection by a monitor computer to a telecommunication terminal via a direct link to the telecommunication terminal; receiving terminal status information intended for visual presentation by the telecommunication terminal via a network from an endpoint; transmitting terminal status information intended for visual presentation to the monitor computer by the telecommunication terminal via the direct link; converting the terminal status information intended for visual presentation to audio terminal status information by the monitor computer; and presenting the audio terminal status information to a user of the telecommunication terminal.

DETAILED DESCRIPTION

Figure 1:
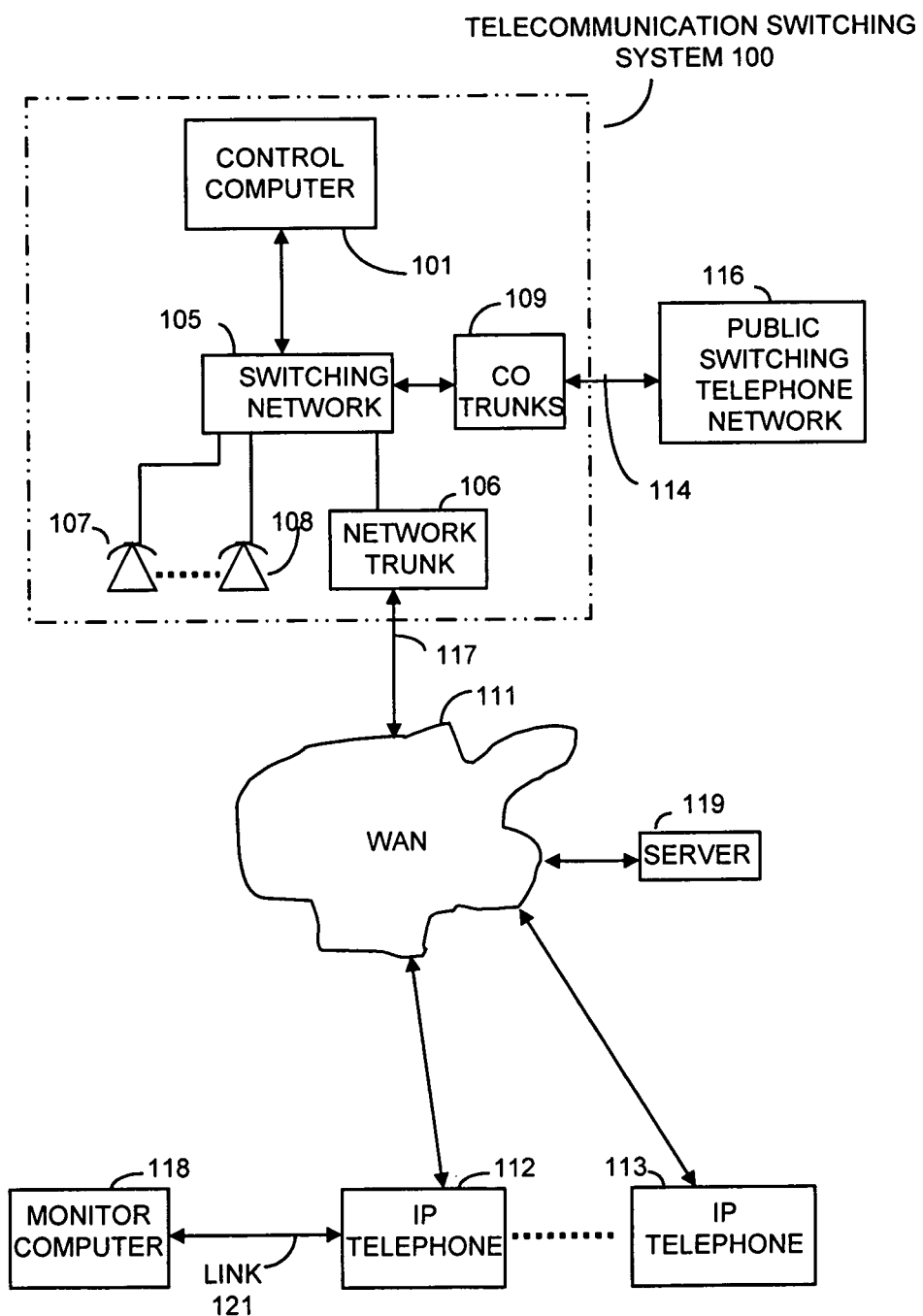
FIG. 1 illustrates, in block diagram form, an embodiment.
Figure 2:
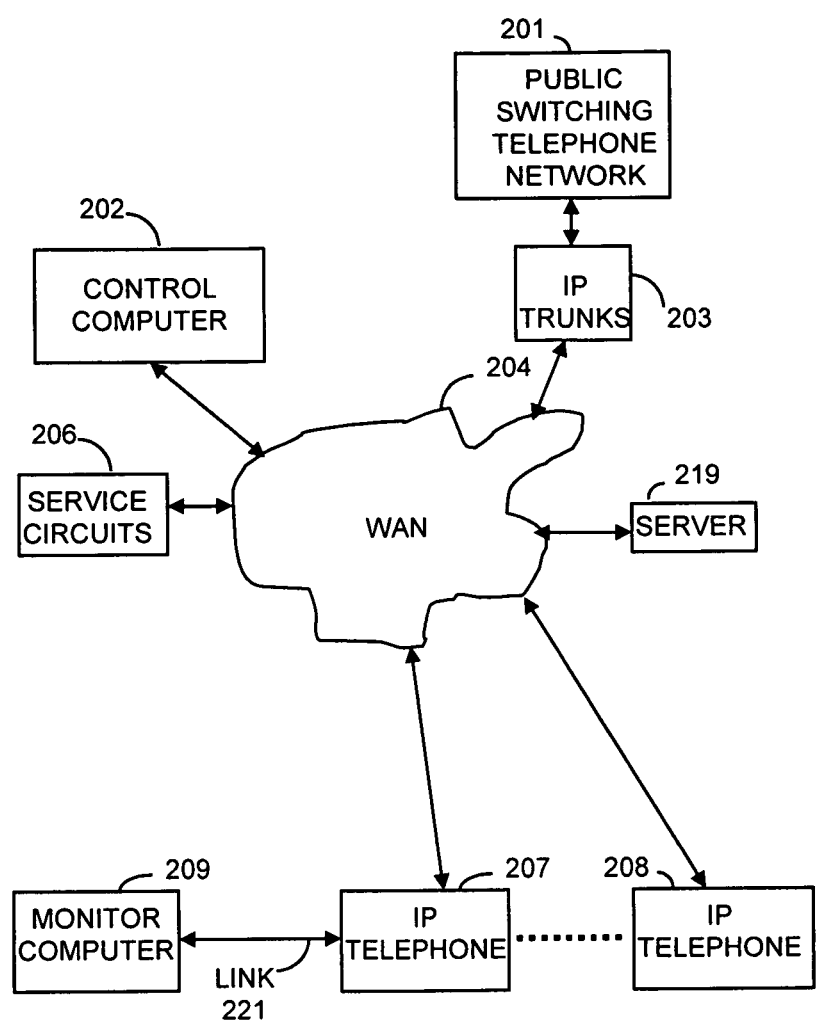
FIG. 2 illustrates, in block diagram form, an embodiment.
Figure 11:
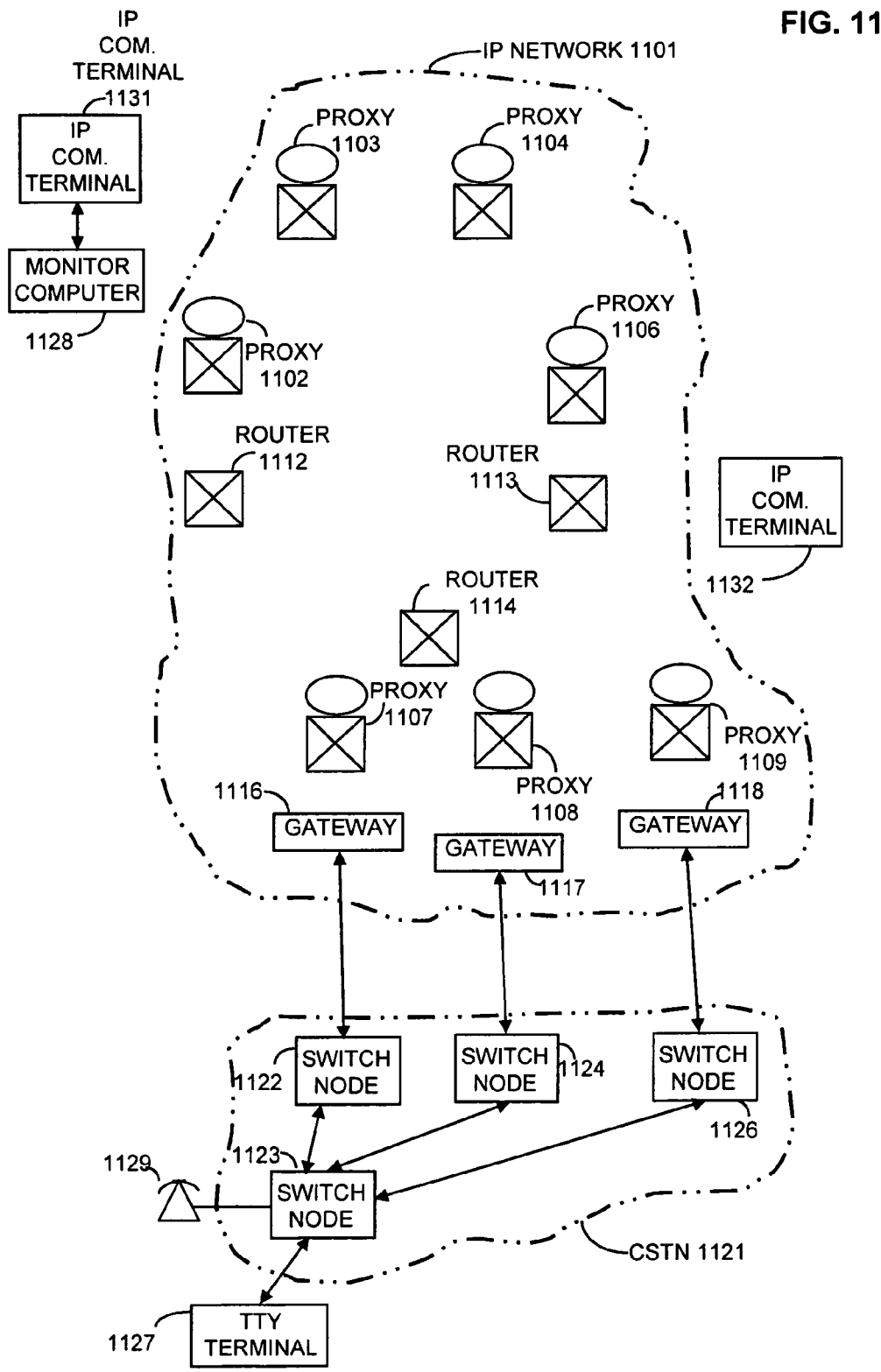
FIG. 11 illustrates, in block diagram form, an embodiment.

FIGS. 1, 2, and 11 illustrate embodiments for implementing the invention. In FIG. 1, control computer 101 performs the overall control functions for conventional telephones 107-108 and IP telephone sets 112-113. IP telephone sets 112-113 may be IP telephone set 4624 manufactured by Avaya Inc. or a similar telephone set. Switching network 105 performs the switching of not only audio information but also control information to and from computer 101 to the telephone sets. Computer 101 is interconnected to wide area network (WAN) 111 via network trunk 106. Control computer 101 controls the activity of IP telephone sets 112-113 by the transmission of terminal status information and the receipt of terminal status information from the IP telephone sets via WAN 111. Control computer 101 controls telephones 107-108 by the transmission of status and reception of control information via switching network 105. Telephone sets 107-108 can be analog telephone sets, ISDN telephone sets, or proprietary digital protocol telephones sets. Monitor computer 118 is utilized to provide the audio information representing the visual status signals of one of the IP telephone sets. Monitor computer 118 can be a desktop PC, laptop, a pocket PC, or a hand held unit. Telecommunication switching system 100 is connected to public switching network 116 via CO trunks 109 and trunks 114.

FIG. 2 illustrates another embodiment for implementing the invention. Control computer 202 is controlling the operations of IP telephone sets 207-208 with respect to telecommunication operations by the transmission and reception of control information via WAN 204. Service circuits 206 under the control of control computer 202 provide tone generation, conferencing, etc. via WAN 204 to IP telephone sets 207-208. For a telecommunication call which is only between two IP telephone sets, the IP telephone sets communicate via WAN 204 for the transmission of audio information. Public switching network 201 is interconnected to WAN 204 via IP trunk 203. Monitor computer 209 and server 219 perform similar functions to those performed by monitor computer 118 and server 119 of FIG. 1.

Consider now an example of how monitor computer 118 would provide audio terminal status information for IP telephone set 112 in one embodiment of the invention. To perform its operations, monitor computer 118 establishes communication with IP telephone set 112 via link 121. Link 121 can be a USB link, infrared link, wireless link, Bluetooth link, wired link, or any other type of link well known to those skilled in the art.

Control terminal status information transmitted from computer 101 to IP telephone set 112 is relayed to monitor computer 118 by IP telephone set 112. In one embodiment of the invention, monitor computer 118 is responsive to the terminal status information being received from IP telephone set 112 which will cause different indicators to be lit on IP telephone set 112 to convert this terminal status information into audio information that monitor computer 118 presents to the user via a speaker, headphones, or other types of audio transducers attached to monitor computer 118. As will be discussed later, the user of monitor computer 118 has the capability for determining what type of terminal status information will be presented in audio information and also how often.

In the previous example, the embodiment utilized the audio reproduction capability of monitor computer 118 to present the audio terminal status information to the user. In another embodiment, monitor computer 118 transmits the audio terminal status information to IP telephone set 112 via link 121 for presentation to the user. Monitor computer 118 is responsive to the terminal status information being transmitted to IP telephone set 112, to convert the terminal status information to audio terminal status information, and to transmit this audio terminal status information via link 121 to IP telephone set 112. In response to the audio terminal status information from monitor computer 118, IP telephone set 112 presents this information to the user via the internal CODEC of IP telephone set 112. The output of the CODEC of IP telephone set 112 presents the audio terminal status information to the user in the same audio stream as is being utilized for the actual telecommunication call. Alternatively, IP telephone set 112 could utilize a built-in speaker such as one used as a speaker phone to present this information. Alternately, as is well known to those skilled in the art, IP telephone set 112 could also convert the received audio terminal status information to information to be presented to the user using another conversion technique rather than that used by its CODEC.

The previous embodiments described for FIG. 1 can be implemented on the system illustrated in FIG. 2.

In an embodiment of an IP telephone set in order to protect the systems of FIGS. 1 and 2 from a security breach via the IP telephone set by a monitor computer, the IP telephone set has a firewall not to prevent access to the IP telephone set from the systems of FIGS. 1 and 2; but rather, to protect the systems from access by the monitor computer. The access to the monitor computer is restricted only to the IP telephone set, and the monitor computer can not access the systems via the IP telephone set when the firewall is used. Note, an IP telecommunication terminal of FIG. 11 could also employ a firewall.

Figure 3:
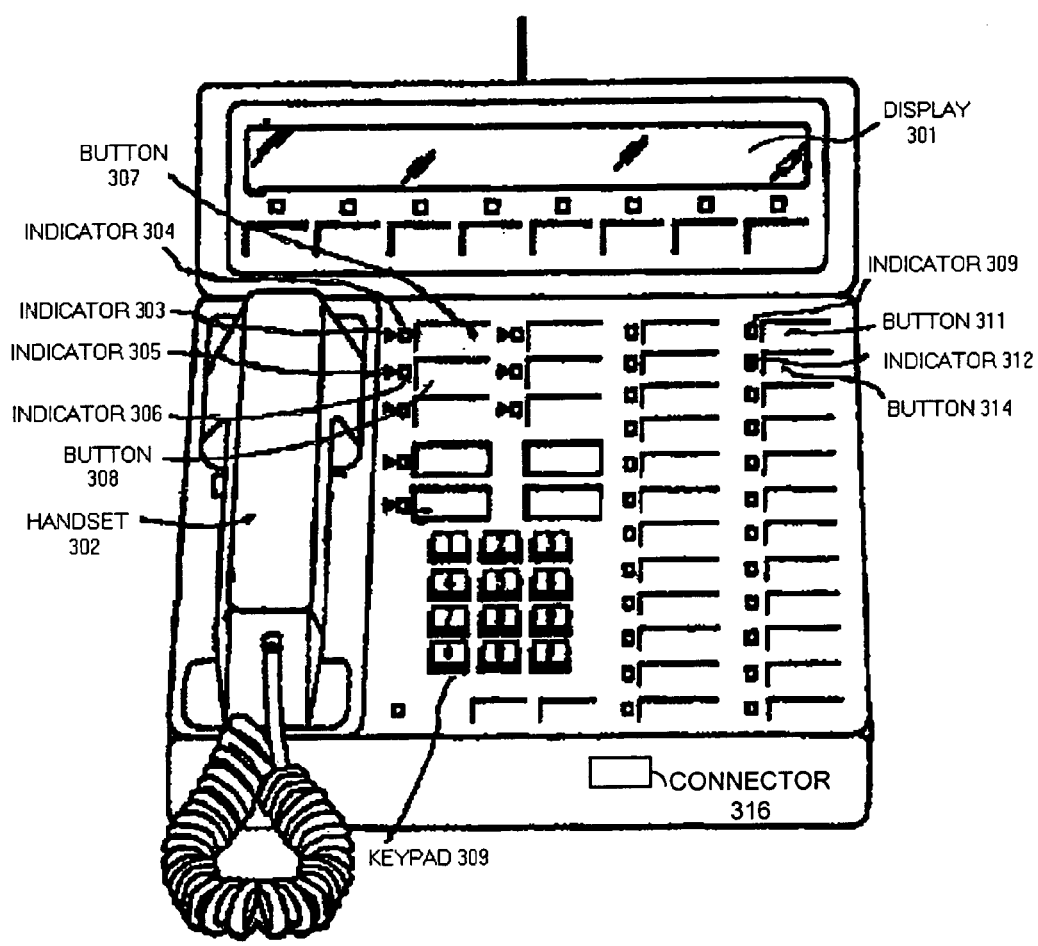
FIG. 3 illustrates, in pictorial form, an embodiment of an IP telephone set.

FIG. 3 illustrates an embodiment of IP telephone set 112. The user of IP telephone set 112 speaks and listens through handset 302. Although not illustrated in FIG. 3, IP telephone set 112 also has a speaker and microphone for conference calls. Display 301 is utilized to display the telephone number being dialed by keypad 309 during the placement of an outgoing call and displays the name and telephone number of the calling party for an incoming call. IP telephone set 112 has a number of telephone lines that could be selected with each line being denoted by a pair of indicators and a button. For example, indicators 303 and 304 and button 307 indicate line 1. Indicators 305 and 306 and button 308 indicate line 2. If the user is active on line 1, indicator 304 will be on as well as indicator 303. If the user has a caller on hold on line 2, indicator 305 will flash. The user of IP telephone set 112 selects line 1 by activating button 307. Similarly, the user activates line 2 by activating button 308.

Pairs of indicators and buttons, such as indicator 309 and button 311, may be used for activating a variety of operations. One is to automatically dial a party that had been preprogrammed by the user or to activate a feature such as using the conference facilities of IP telephone set 112. If button 311 is activated, indicator 309 will turn on. Indicator 312 and button 314 have similar functions. In general, there would be a number of such combinations of indicators and buttons as illustrated by 309, 311, 312, and 314. All button activation information is transmitted to control computer 101, and control computer 101 controls the state of the indicators. Conductor 316 provides the communication for link 121 or 221. This conductor 316 may be a mechanical connector if link 121 or 221 is a USB link or a infrared or wireless port for a infrared or wireless link. One skilled in the art could readily envision conductor 316 being located on a different surface of IP telephone set 112.

Figure 4:
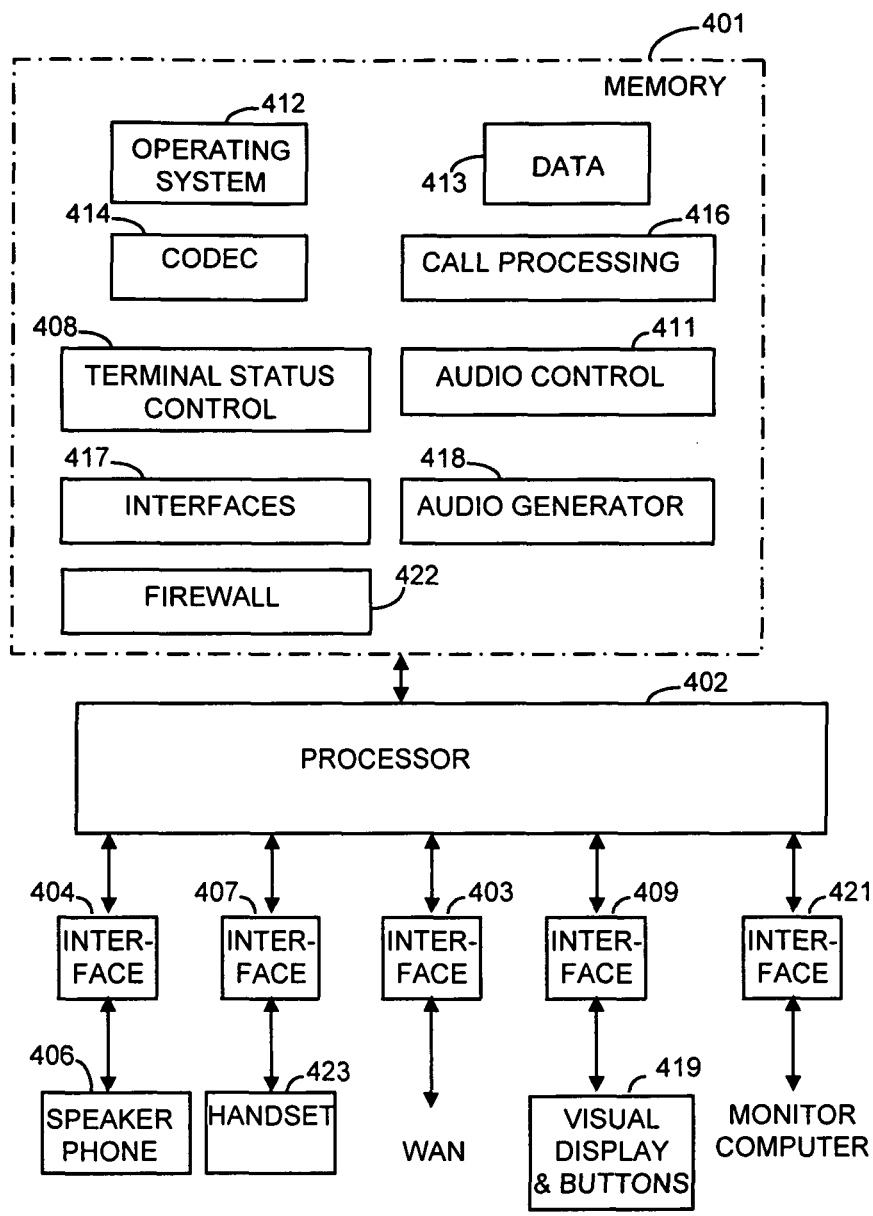
FIG. 4 illustrates, in block diagram form, an embodiment of an IP telephone set.

FIG. 4 illustrates, in block diagram form, one embodiment of IP telephone set 112. Processor 402 provides the overall control for the functions of IP telephone set 112 by executing programs and storing and retrieving data from memory 401. A processor such as processor 402 may also be referred to as a central processing unit or a computer. Processor 402 connects to WAN 111 or 204 via interface 403. Processor 402 interfaces to handset 423 via interface 407, to speaker phone 406 via interface 404 and connects to visual display and buttons 419 via interface 409. Visual display and buttons 419 is all of the indicators, buttons keypad, and display of IP telephone set 112. Interface 421 provides an interface to monitor computer 118. Processor 402 performs the operations of IP telephone set 112 by executing the routines illustrated in memory 401.

Operating system 412 provides the overall control and the necessary protocol operations. Operating system routine 412 provides all control functions required to implement the TCP/IP protocol as is well known to those skilled in the art. CODEC 414 encodes and decodes the audio information for communication with handset 423 or conference speaker and microphone 406 for communication with WAN 111 or 204. Overall control of the call processing is performed by the IP telephone set 112 under the control of call processing routine 416. The communication and control of the various interfaces illustrated in FIG. 4 is provided by interfaces routine 417. Audio generator routine 414 implements other software methods for reproducing sounds for utilization with the invention.

Terminal status control routine 408 terminates the communication that is established by monitor computer 118 via interface 421 to receive the terminal status information from IP telephone set 112 as described in the previous examples. Terminal status control routine 408 is responsive to messages from monitor computer 118 to establish the communication that allows monitor computer 118 to communicate with terminal status control routine 408. When monitor computer 118 initiates communication with IP telephone set 112, it establishes communication with interface 421 and terminal status control routine 408 of IP telephone set 112. Terminal status control routine 408 receives information from call processing routine 416 concerning control information received via WAN 111 to update indicators or display 301 of visual display and buttons 419. Similarly, terminal status control 408 receives actuation information for buttons or the keypad of block 419 from call processing routine 416. Terminal status control 408 transmits this terminal status information to monitor computer 118.

Audio control routine 411 also establishes communication with monitor computer 118 in a manner similar to terminal status control routine 408, as described in the previous examples, to have IP telephone set 112 reproduce the audio terminal status information. In this manner, monitor computer 118 and audio control routine 411 are interconnected. The operating system of the IP telephone set 112 then directs future audio messages from monitor computer 118 to audio control routine 411. Similarly, messages from audio control routine 411 to link 121 are transmitted to monitor computer 118. The speaker of unit 406 or the receiver of handset 302 can be utilized for this reproduction of the audio terminal status information. Audio control 411 can utilize CODEC routine 414 to reproduce this audio terminal status information or audio generator routine 418. The audio information is transferred via the appropriate handset to either the speaker or receiver.

Firewall routine 422 controls all access to the WAN via interface 403. Firewall routine 422 will allow software elements such as operating system 412 or call processing routine 416 access to the WAN but will not allow status control routine 408 to communicate via the WAN. Firewall routine 422 prevents status control routine 408 or audio control routine 411 from communicating via the WAN so as to prevent the monitor computer from getting unauthorized access to the WAN. This is done to protect the data security of the systems illustrated in FIGS. 1, 2, and 11. Note, firewall routine 422 will prevent any routine having direct communication with the monitor computer from communicating with the WAN. Firewall routine 422 operates in a manner well known to those skilled in the art.

Figure 5:
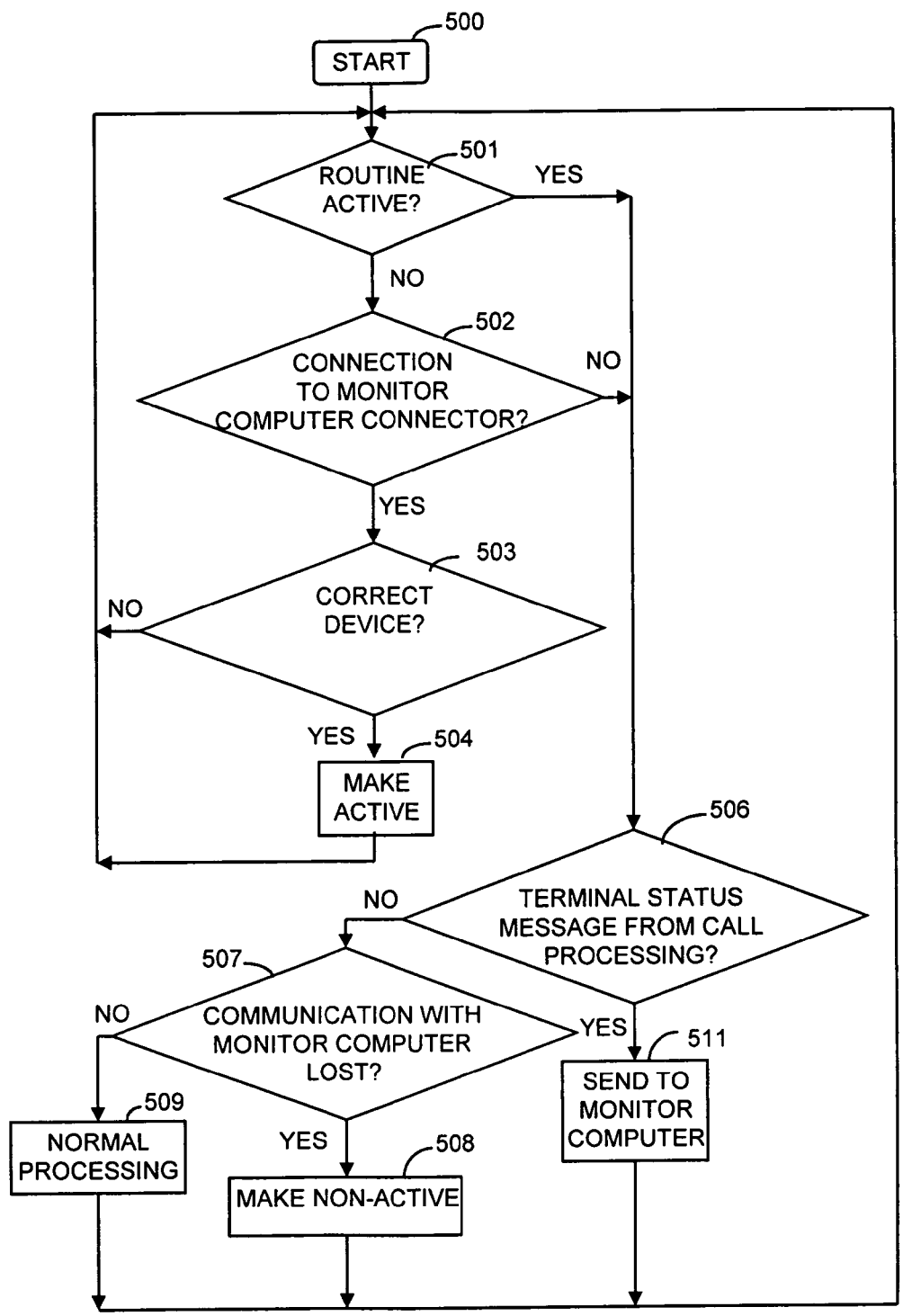
FIG. 5 illustrates, in flow chart form, operations performed by an embodiment of a status control routine.

FIG. 5 illustrates, in flowchart form, operations performed by an embodiment of a status control routine such as status control routine 408 of FIG. 4. After being started in block 500, decision block 501 determines if the routine is active with respect to receiving terminal status information from an IP telephone set. Active in this case means that there is communication set up between the monitor computer and an IP telephone set by the operating system. If the answer is no, decision block 502 determines a device has been connected to has been connected to connector 316. This may indicate that a monitor computer is attempting to establish communication with a status control routine. If the answer is yes, decision block 503 determines if the correct device has been connected. If the answer is no, control is transferred back to decision block 501. If the answer is yes, block 504 makes the state active and sends a message to the operating system to establish the communication with the monitor computer. Note, that one skilled in the art could readily envision that blocks 501-504 could be performed within the operating system or some other routine.

If the answer is yes in decision block 501 or no in decision block 502, control is transferred to decision block 506. Decision block 506 determines if there is new terminal status information from the call processing routine. For certain types of links, the monitor computer may have to periodically poll the IP telephone set. If the answer is no, control is transferred to decision block 507 which determines if communication has been lost with the monitor computer. The operating system would normally detect this loss of communication and inform the status control routine in a manner well known to those skilled in the art. If the answer is no in decision block 507, control is transferred to block 509 which performs normal processing before returning control back to decision block 501. If the answer in decision block 507 is yes, control is transferred to block 508 which sets the state to non-active before returning control back to decision block 501.

Returning to decision block 506, if a terminal status message has been received from the call processing routine, block 511 transmits this message to the monitor computer before transferring control back to decision block 501.

Figure 6:
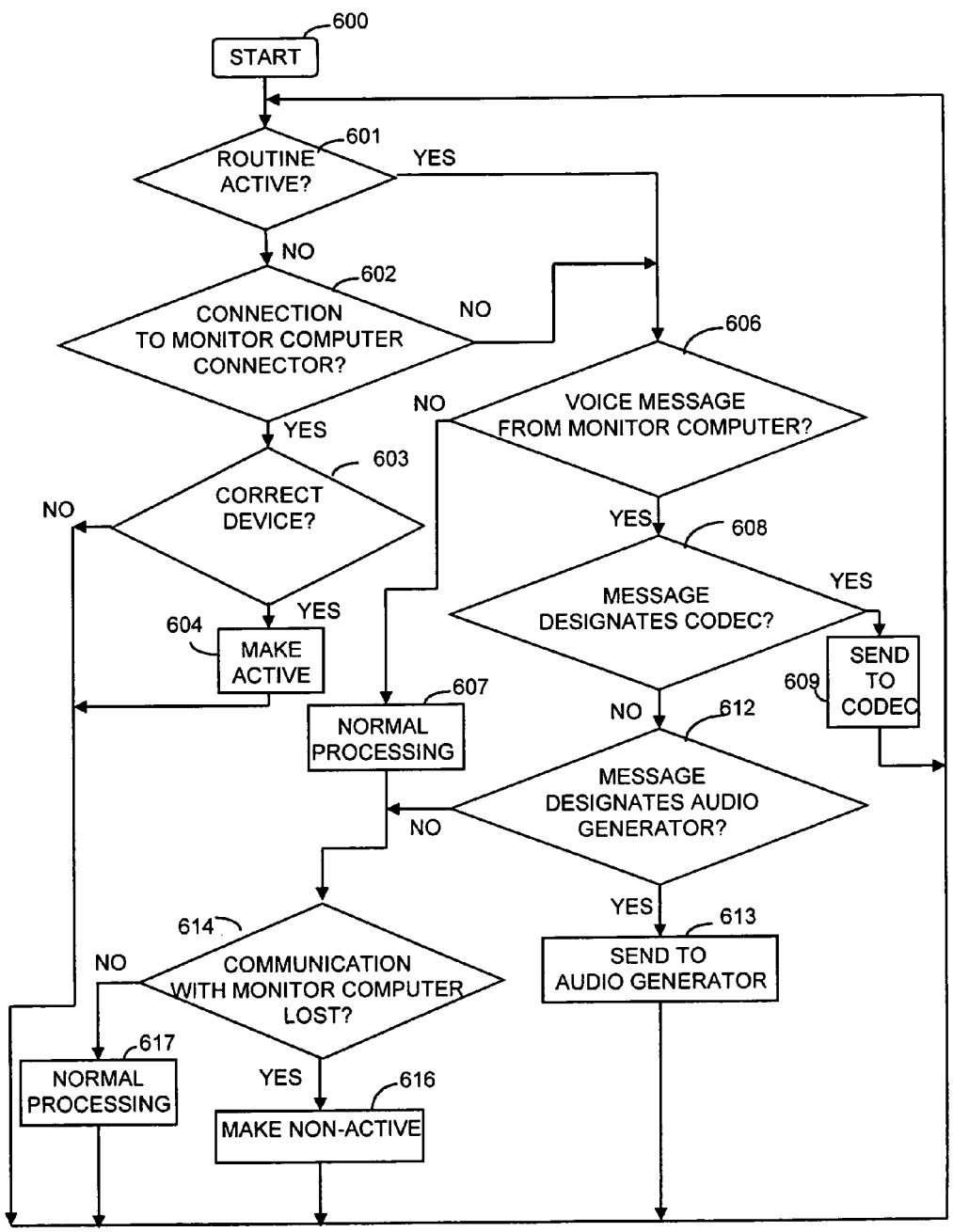
FIG. 6 illustrates, in flow chart form, operations performed by an embodiment of an audio control routine.

FIG. 6 illustrates, in flowchart form, operations performed by one embodiment of an audio control routine such as audio control routine 411 of FIG. 4. After being started in block 600, decision block 601 determines if the routine is active with respect to receiving terminal status information from an IP telephone set. Active in this case means that there is communication set up to a monitor computer by the operating system. If the answer is no, decision block 602 determines if a connection has been made to connector 316. This may indicate that a monitor computer is attempting to establish communication with a status control routine. If the answer is yes, decision block 603 determines if the correct device has made the connection. If the answer is no, control is transferred back to decision block 601. If the answer is yes, block 604 makes the state active and sends a message to the operating system to establish communication between the monitor computer and the IP telephone set. Note, that one skilled in the art could readily envision that blocks 601-604 could be performed within the operating system or some other routine.

If the answer is yes in decision block 601 or no in decision block 602, control is transferred to decision block 606. The latter decision block determines if a voice message has been received from the monitor computer. If the answer is no, control is transferred to block 614 whose operations are described below. If the answer in decision block 606 is yes, decision block 608 determines if the voice message designates that the CODEC routine of the IP telephone should be utilized to present the message to the user. If the answer is yes in decision block 608, the message is sent to the CODEC routine by block 609. Note, if the message is sent to the CODEC then the message will be played in the receiver of the IP telephone set that is currently being utilized by the user.

Returning to decision block 608. If the answer is no, decision block 612 determines if the message designates that the audio generator routine is to be used to present the message to the user. If the answer is yes, block 613 transmits the voice message to the audio generator routine before transferring control back to decision block 601.

Returning to decision block 612, if the answer is no, control is transferred to decision block 614 which determines if communication has been lost with the monitor computer. The operating system would normally detect this loss of communication and inform the status control routine in a manner well known to those skilled in the art. If the answer is no in decision block 614, control is transferred to block 617 which performs normal processing before returning control back to decision block 601. If the answer in decision block 614 is yes, control is transferred to block 616 which sets the state to non-active before returning control back to decision block 601.

Figure 7:
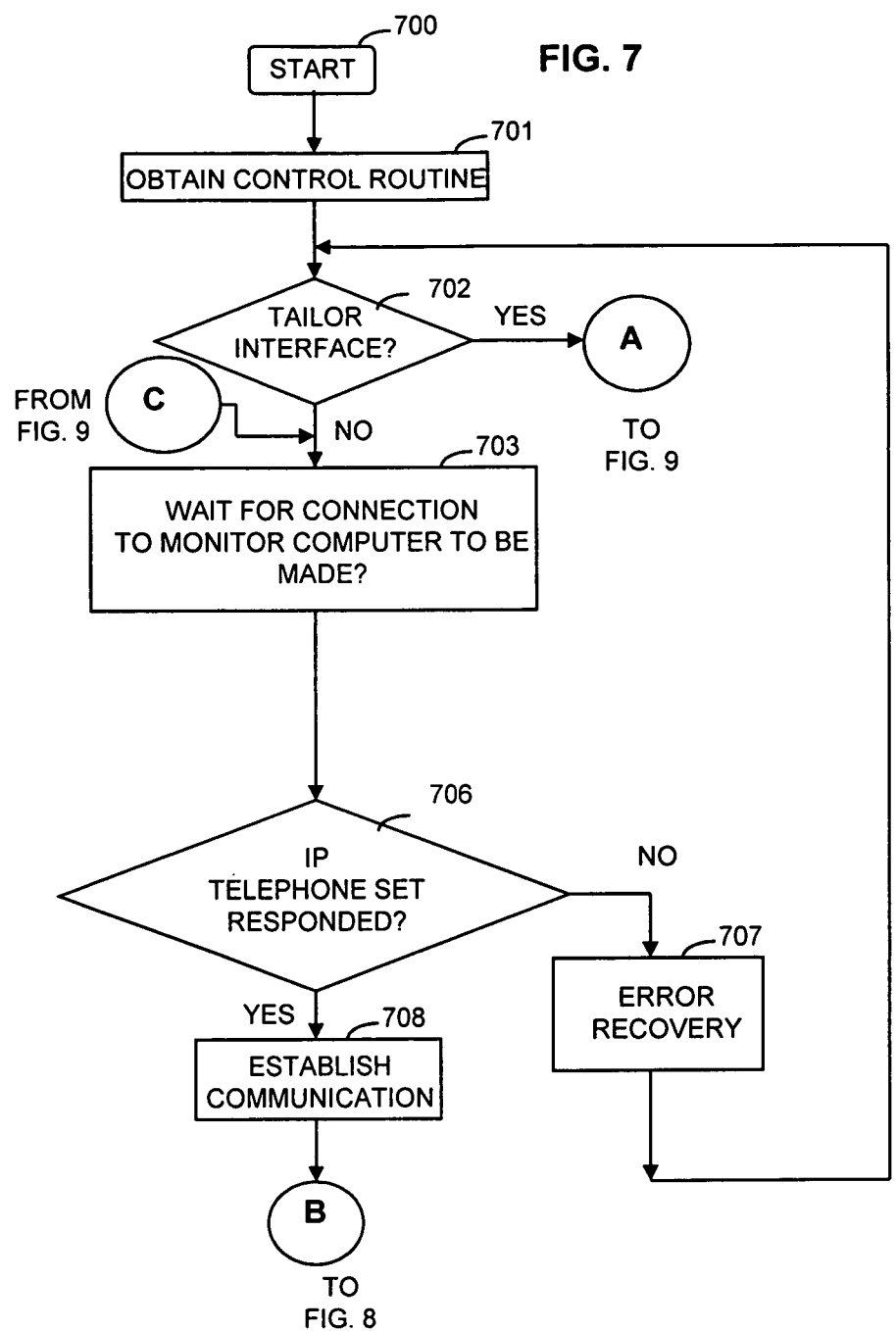
FIGS. 7-9 illustrate, in flow chart form, operations performed by an embodiment of a monitor computer.
Figure 8:
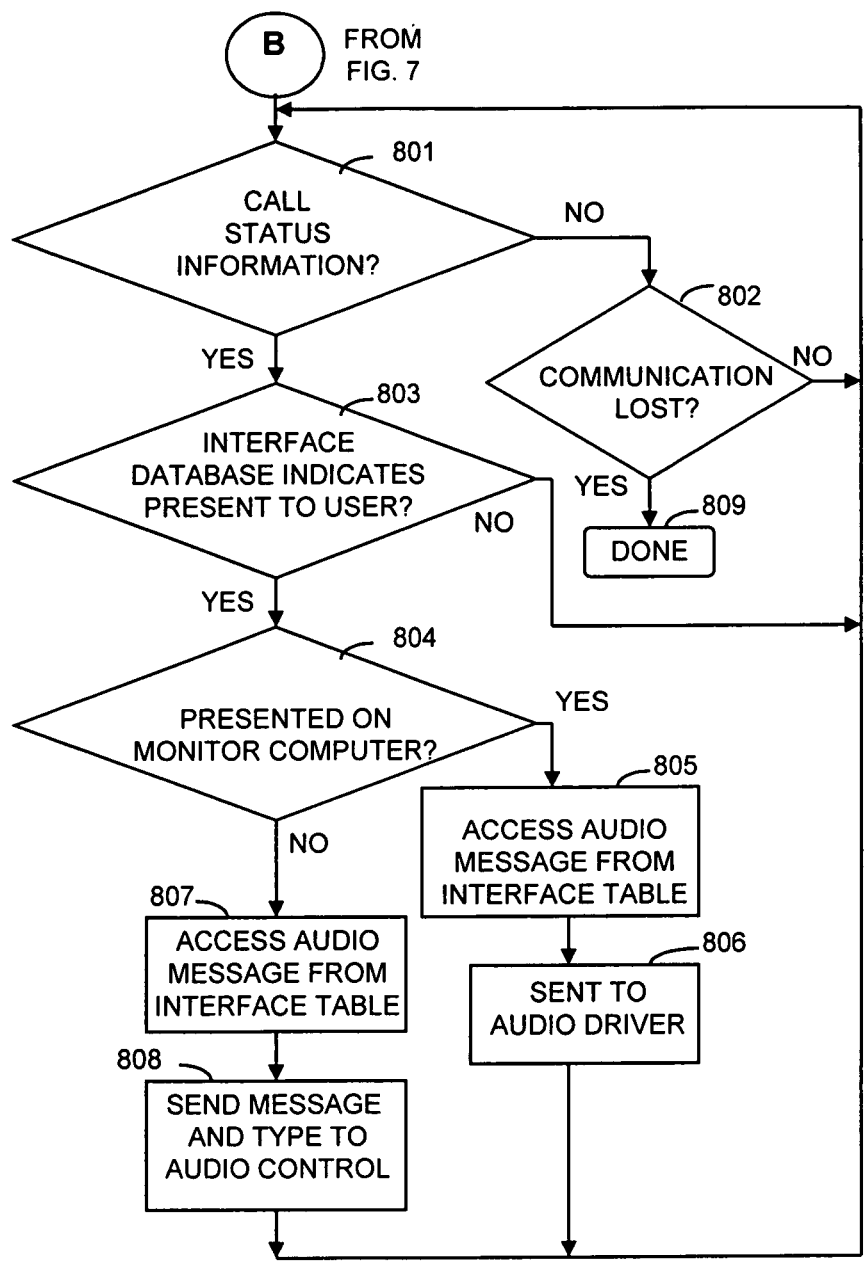
Figure 9:
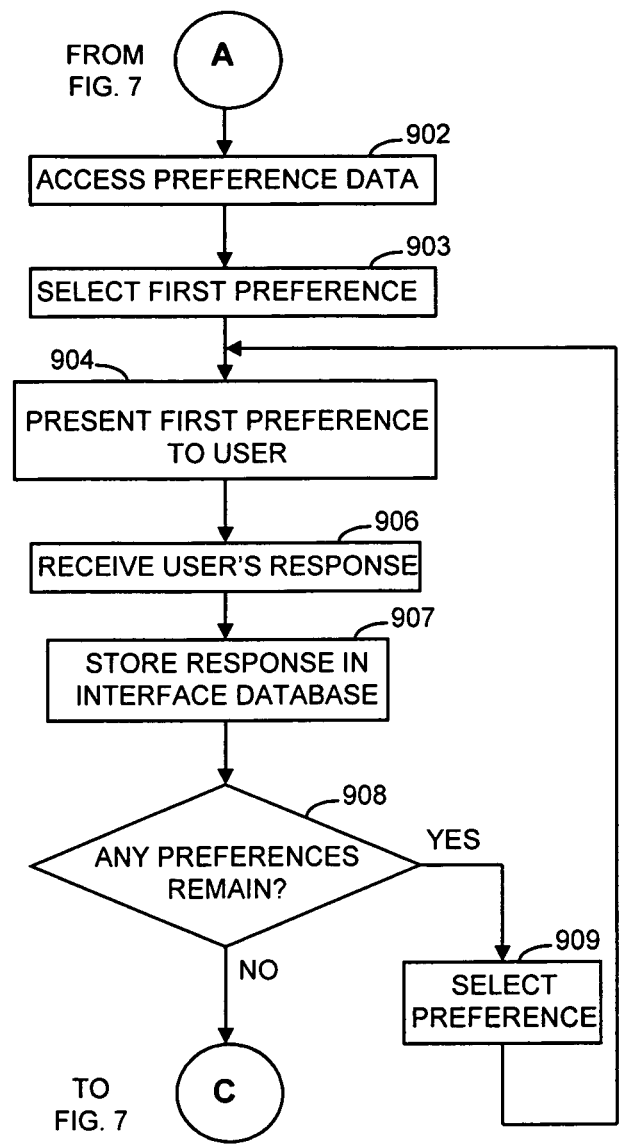

FIGS. 7-9 illustrate, in flowchart form, operations performed by one embodiment of a monitor computer such as monitor computer 118 of FIG. 1 where the monitor computer is receiving the terminal status information from an IP telephone set. After being started, in block 700, block 701 obtains the control routine whose operations are illustrated in FIGS. 7-9. The control routine will be obtained from internal memory. After the control routine is obtained and executed, decision block 702 determines if it is necessary to tailor the user interface or the user. This decision is based on whether the system allows such tailoring and whether it is necessary. It may be that the interface has already been tailored for the user, and this information is stored in an interface database. If the answer in decision block 702 is yes, control is transferred to block 902 of FIG. 9. If the answer in decision block 702 is no, block 703 waits for a connection to be made to an IP telephone set.

After execution of block 703, control is transferred to decision block 706 which determines if an IP telephone set is connected. If the answer in decision block 706 is no, control is transferred to block 707 which performs error recovery before transferring control back to block 703. If the answer is decision block 706 is yes, block 708 establishes communication with the operating system of the IP telephone set that is connected. Block 708 establishes communication to the status control routine of that IP telephone set before transferring control to decision block 801 of FIG. 8.

Decision block 801 determines if terminal status information has been received as a message from the IP telephone set. For certain types of links, decision block 801 may have to periodically poll the IP telephone set. If the answer is no, decision block 802 determines if communication has been lost between the monitor computer and the IP telephone set. If the answer is yes, operations are terminated in block 809. In addition to transferring control to block 809 upon communication being terminated between the monitored computer and the IP telephone set, decision block 802 also is responsive to user input to terminate operations. If the answer is no in decision block 802, control is transferred back to decision block 801.

Returning to decision block 801, if the answer is yes, control is transferred to block 803 which accesses the interface database to determine if the particular terminal status information should be presented to the user. As is discussed with respect to FIG. 9, the user or system administrator has the capability of determining which terminal status information will be presented to the user as well as how often a particular type of terminal status information must occur before an instance of the terminal status information is presented to the user. If the answer is no in decision block 803, control is transferred back to decision block 801. If the answer is yes in decision block 803, control is transferred to decision block 804 which determines from the interface database if the terminal status information is to be presented by the monitor computer or transmitted to the IP telephone set for presentation to the user. If the answer in decision block 804 is that the monitor computer should present the information, block 805 accesses the encoded audio message from the interface database along with the audio driver type that is to be utilized, and block 806 transmits the terminal status information to the audio driver of the monitor computer for playout. If the decision in decision block 804 is that the terminal status information is to be presented in audio form to the user on the IP telephone set, block 807 accesses the encoded audio message from the interface database along with the audio driver type that is to be utilized on the IP telephone set. Block 808 then sends a message that contains the encoded audio message and the audio driver type to the audio control routine of the IP telephone set before transferring control back to decision block 801.

Returning to FIG. 7, if the answer in decision block 702 is yes that the user interface must be tailored, control is transferred to block 902 of FIG. 9. FIG. 9 illustrates the operations performed by an embodiment in gathering the options of a user wants visual information communicated to them with audio messages. The audio messages can be voice messages or other audio sounds. For example, if the user is talking on one call but has a second call on hold, the user may choose to have the fact that the second call is on hold presented to them as an audio tone or as a voice message. In addition, the user can specify their preference for how often they should receive an audio message with respect to the call on hold. The preference data comprises the various visual messages that can be transmitted to the users IP telephone set and the options that the user has to tailor the resulting audio messages. The interface may be tailored to each individual user or a system administrator may establish one standard interface. In one embodiment, if the system administrator is determining the interface, then, the preference information and accompanying options would be presented in a visual table or other means well known to those skilled in the art. If the information is presented to each user, then in one embodiment the preference information with options is presented as a voice message and the user would select options by responding with voice responses. The voice responses would be interpreted using well known voice-to-text software routines. After receiving control from decision block 702, block 902 access the preference data for a particular IP telephone set, and block 903 selects the first preference as the selected preference to be presented to the user by block 904. Block 906 receives the user's response and converts this response to text and verifies that it is a correct response. Block 907 then stores the received response in the interface database. Decision block 908 determines if there are any preferences that remain to have options selected. If the answer is yes, control is transferred to block 909. Block 909 selects the next preference from the preference data and transfers control back to block 904. If the answer in decision block 908 is no, control is transferred back to block 703 of FIG. 7.

Figure 10:
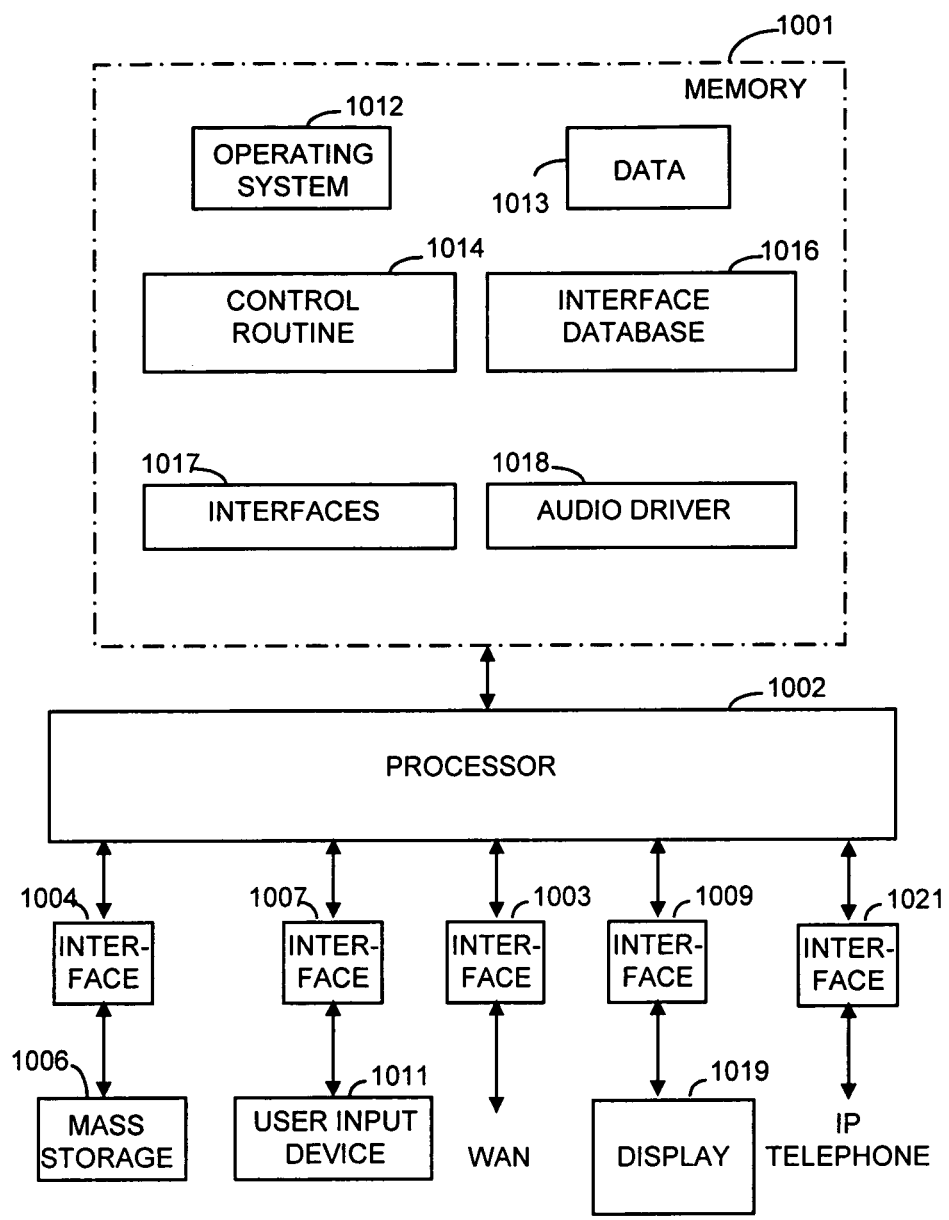
FIG. 10 illustrates, in block diagram form, an embodiment of a monitor computer.

FIG. 10 illustrates, in block diagram form, one embodiment of a monitor computer. Processor 1002 provides the overall control for the functions of a monitor computer by executing programs and storing and retrieving data from memory 1001. A processor such as processor 1002 may also be referred to as a central processing unit or a computer. Processor 1002 connects to WAN 111 or 204 via interface 1003. Processor 1002 interfaces to user input device 1011 via interface 1007 and connects to display 1019 via interface 1009. Processor 1002 interfaces to an IP telephone via interface 1021. Processor 1002 performs the operations of a monitor computer by executing the routines illustrated in memory 1001.

Operating system 1012 provides the overall control and the necessary protocol operations. Operating system routine 1012 provides all control functions required to implement the TCP/IP protocol as is well known to those skilled in the art. Data is stored in data block 1013. Interface database 1016 stores preferences and options that define the user interface. Overall control is performed by control routine 1016. The communication and control of the various interfaces illustrated in FIG. 10 is provided by interfaces routine 1017. Audio driver 1018 controls the reproduction of sounds.

The monitor computer illustrated in FIG. 10 may be a personal computer, personal digital assistant (PDA), cell phone, music player, or a specially designed device. In addition, the monitor computer may not have all of the elements illustrated in FIG. 10. For example, elements 1004, 1006, 1009, and 1019 or some combination of these elements may not be present.

In another embodiment, FIG. 11 illustrates IP network 1101 interconnected to a circuit switched telephone network (CSTN) 1121 via gateways 1116-1118. Circuit switched telephone network 1121 is providing service for devices 1127 or 1129. IP network 1101 is providing service for terminals 1131-1132. One skilled in the art could readily see that there could be a multitude of devices being interconnected by IP network 1101. Such devices may be, but are not limited to, computers, voice messaging systems, and instant messaging systems. Similarly, circuit switched telephone network 1121 could also be interconnecting a variety of telephone types and terminal types and systems and switch nodes 1122-1126 may be PBX's or central office switches.

IP network 1101 utilizes the session initiation protocol (SIP). SIP is defined in the Internet Engineering Task Force (IETF) Request for Comments (RFC) 3261 "SIP: Session Initiation Protocol", June, 2002. SIP solves the general problem of finding "dialed" endpoints and exchanging critical parameters which endpoints must agree on in order to establish media sessions (calls) across IP network 1101. The SIP protocol supports the establishment of voice-only sessions or multimedia sessions. SIP endpoints (such as IP communication terminals 1131 and 1132) control the supported media types by accepting or rejecting offered media streams. Once the session parameters are exchanged, the endpoint devices send session data directly to each other without using SIP utilizing the RTP protocol to route directly through routers such as routers 1112-1114.

SIP has a generalized address structure that supports "dialing" by URL (like an email address) or "dialing" by a number (like a PBX or Public Switched Telephone Network number). This generalized SIP addressing structure is a powerful aspect of SIP service as it effectively bridges circuit-switched and IP domains into a converged addressing domain.

SIP proxies (such as proxies 1102-1109) operating in autonomous network domains interpret the "dialed" addresses and route session requests to other proxies or endpoints registered within the domain. Greater detail on the operations of the system illustrated in FIG. 11 operating using the SIP protocol can be found in U.S. patent application Ser. No. 11/217,531 filed Sep. 1, 2005, which is assigned to the same assignee as the present patent application and is hereby incorporated by reference.

Figure 12:
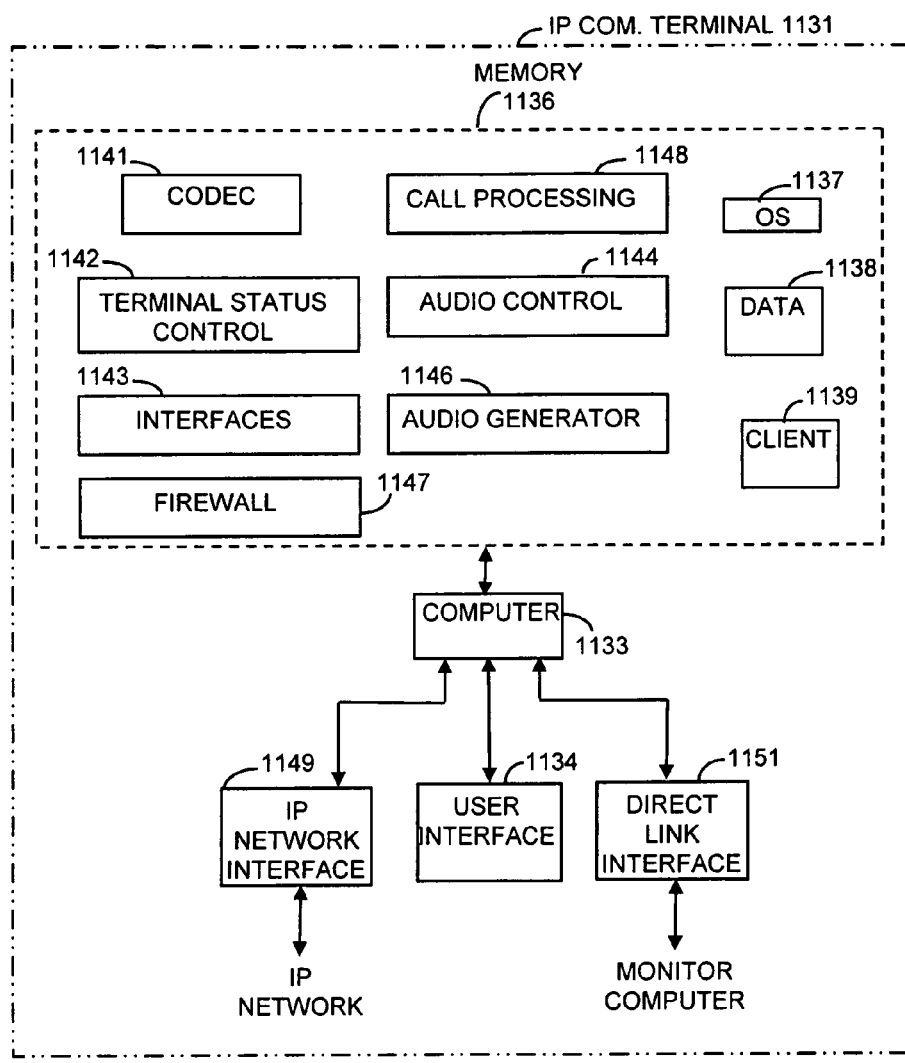
FIG. 12 illustrates, in block diagram form, an embodiment of an IP communication terminal.

FIG. 12 illustrates, in block diagram form, greater details of IP communication terminal 1131. The other communication terminals of FIG. 11 are similar in design. Block 1134 provides the functions of handset 423, visual display and buttons 412, and speaker phone 406 of FIG. 4. Direct link interface 1151 provides the interface to the monitor computer. IP network interface 1149 provides the interface to the IP network.

Within memory 1136, the functions of block 1137-1139 have already been described in the incorporated patent application. Blocks 1141-1147 perform functions as described for blocks 414 and 408-422 of FIG. 4. As is well known by those skilled in the art, for peer-peer communication between telecommunication terminals, call processing routine 1148 in addition to performing all of the call processing functions also generates the terminal status information that is used to indicate the terminal status to the user and is communicated to terminal status control 1142 which performs the operations illustrated in FIG. 5. Call processing routine 1148 may generate more terminal status information than can be displayed by the visual portion of user interface 1134. However, call processing routine 1148 will transmit all of the terminal status information to terminal status control routine 1142 so that it can be presented as audio information to the user of IP communication terminal 1131.

With respect to monitor computer 1128 providing audio terminal status information for IP communication terminal 1131, IP communication terminal 1131 and monitor computer 1128 operate in a manner similar to that described for monitor computer 118 providing audio terminal status information for IP telephone set 112 of FIG. 1.

When the operations of an IP telephone set or monitor computer are implemented in software, it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. The IP telephone set or monitor computer can be embodied in any computer-readable medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can store the program for use by or in connection with the instruction execution system, apparatus, or device. For example, the computer-readable medium can be, but is not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical).

In an alternative embodiment, where IP telephone set or monitor computer is implemented in hardware, IP telephone set or monitor computer can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array (s) (PGA), a field programmable gate array (FPGA), etc.

Of course, various changes and modifications to the illustrated embodiments described above will be apparent to those skilled in the art. These changes and modifications can be made without departing from the spirit and scope of the invention and without diminishing its intending advantages. It is therefore intended that such changes and modifications be covered by the following claims except insofar as limited by the prior art.

What is claimed is:

1. A method for providing terminal status information by a telephone set as audio information, comprising:
   generating terminal status information by a telephone set;
   establishing a direct connection by a monitor computer to the telephone set via a direct link to the telephone set;
   transmitting the generated terminal status information to the monitor computer by the telephone set via the direct link;
   converting the generated terminal status information to audio terminal status information by the monitor computer; and
   presenting the audio terminal status information to a user of the telephone set.

2. The method of claim 1 further comprises presenting the generated terminal status information as visual information on a visual display.

3. The method of claim 1 further comprises establishing a firewall by the telephone set to prevent the monitor computer from communicating on a network to which the telephone set is connected whereby the monitor computer is also denied access to other devices connected to the network.

4. The method of claim 1 further comprises establishing a firewall by the telephone set to prevent the monitor computer from activating any operations in the telephone set unrelated to analysis and presentation of terminal status information.

5. The method of claim 1 wherein the direct link is at least one of a wireless or a wired link.

6. The method of claim 1 wherein the presenting comprises producing the audio terminal status information on the telephone set.

7. The method of claim 6 wherein the presenting further comprises transmitting the audio terminal status information from the monitor computer to the telephone set.

8. The method of claim 6 wherein the audio terminal status information is produced by a CODEC used for telecommunication voice information of telecommunication calls.

9. The method of claim 6 wherein the audio terminal status information is produced by an audio generator other than a CODEC used for telecommunication voice information of telecommunication calls.

10. A method for providing terminal status information intended for visual presentation as audio information, comprising:
    establishing a direct connection by a monitor computer to a telephone set via a direct link to the telephone set;
    receiving terminal status information intended for visual presentation by the telephone set via a network from a network-connected device;
    transmitting terminal status information intended for visual presentation to the monitor computer by the telephone set via the direct link;
    converting the terminal status information intended for visual presentation to audio terminal status information by the monitor computer; and
    presenting the audio terminal status information to a user of the telephone set.

11. The method of claim 10 further comprises establishing a firewall by the telephone set to prevent the monitor computer from communicating on the network whereby the monitor computer is also denied access to all other network-connected devices.

12. The method of claim 10 further comprises establishing a firewall by the telephone set to prevent the monitor computer from activating any operations in the telephone set unrelated to analysis and presentation of terminal status information.

13. The method of claim 10 wherein the direct link is at least one of a wireless or a wired link.

14. The method of claim 10 wherein the presenting comprises producing the audio terminal status information on the telephone set.

15. The method of claim 14 wherein the presenting further comprises transmitting the audio terminal status information from the monitor computer to the telephone set.

16. The method of claim 14 wherein the audio terminal status information is produced by a CODEC used for telecommunication voice information of telecommunication calls.

17. The method of claim 14 wherein the audio terminal status information is produced by an audio generator other than a CODEC used for telecommunication voice information of telecommunication calls.

18. The method of claim 10 wherein the endpoint is a telecommunication switching system.

19. The method of claim 10 wherein the endpoint is another telephone set.

20. The method of claim 10 wherein presenting comprises producing the audio terminal status information on the monitor computer.

21. A computer-non-transitory readable medium for providing terminal status information by a telephone set as audio information, comprising computer non-transitory executable instructions configured for:
    generating terminal status information by a telephone set;
    establishing a direct connection by a monitor computer to the telephone set via a direct link to the telephone set;
    transmitting the generated terminal status information to the monitor computer by the telephone set via the direct link;
    converting the generated terminal status information to audio terminal status information by the monitor computer; and presenting the audio terminal status information to a user of the telephone set.

22. The computer-non-transitory readable medium of claim 21 further comprises computer non-transitory executable instructions for establishing a firewall by the telephone set to prevent the monitor computer from communicating on a network to which the telephone set is connected whereby the monitor computer is also denied access to other devices connected to the network.

23. The computer-non-transitory readable medium of claim 21 further comprises computer non-transitory executable instructions for establishing a firewall by the telephone set to prevent the monitor computer from activating any operations in the telephone set unrelated to analysis and presentation of terminal status information.

24. The computer-non-transitory readable medium of claim 21 wherein the direct link is at least one of a wireless or a wired link.

25. The computer-non-transitory readable medium of claim 21 wherein the computer non-transitory executable instructions for presenting comprise computer non-transitory executable instructions for producing the audio terminal status information on the telephone set.

26. The computer-non-transitory readable medium of claim 21 wherein the computer non-transitory executable instructions for presenting comprise computer non-transitory executable instructions for producing the audio terminal status information on the monitor computer.

27. The computer-non-transitory readable medium of claim 25 wherein the computer non-transitory executable instructions for presenting further comprise computer non-transitory executable instructions for transmitting the audio terminal status information from the monitor computer to the telephone set.

28. A computer-non-transitory readable medium for providing terminal status information intended for visual presentation as audio information, comprising computer non-transitory executable instructions configured for:
    establishing a direct connection by a monitor computer to a telephone set via a direct link to the telephone set;
    receiving terminal status information intended for visual presentation by the telephone set via a network from a network-connected device;
    transmitting terminal status information intended for visual presentation to the monitor computer by the telephone set via the direct link;
    converting the terminal status information intended for visual presentation to audio terminal status information by the monitor computer; and
    presenting the audio terminal status information to a user of the telephone set.

29. The computer-non-transitory readable medium of claim 28 further comprises computer non-transitory executable instructions for establishing a firewall by the telephone set to prevent the monitor computer from communicating on the network whereby the monitor computer is also denied access to all other network-connected devices.

30. The computer-non-transitory readable medium of claim 28 further comprises computer non-transitory executable instructions for establishing a firewall by the telephone set to prevent the monitor computer from activating any operations in the telephone set unrelated to analysis and presentation of terminal status information.

31. The computer-non-transitory readable medium of claim 28 wherein the direct link is at least one of a wireless or a wired link.

32. The computer-non-transitory readable medium of claim 28 wherein the computer non-transitory executable instructions for presenting comprise computer non-transitory executable instructions for producing the audio terminal status information on the telephone set.

33. The computer-non-transitory readable medium of claim 28 wherein the computer non-transitory executable instructions for presenting comprise computer non-transitory executable instructions for producing the audio terminal status information on the monitor computer.

34. The computer-non-transitory readable medium of claim 32 wherein the computer non-transitory executable instructions for presenting further comprise computer non-transitory executable instructions for transmitting the audio terminal status information from the monitor computer to the telephone set.

35. The computer-non-transitory readable medium of claim 28 wherein the endpoint is a telecommunication switching system.

36. The computer-non-transitory readable medium of claim 28 wherein the endpoint is another telephone set.

37. The computer-non-transitory readable medium of claim 32 wherein presenting comprises producing the audio terminal status information on the monitor computer.

* * * * *